US007793269B2

(12) United States Patent
Singonahalli et al.

(10) Patent No.: US 7,793,269 B2
(45) Date of Patent: Sep. 7, 2010

(54) PARALLEL SOFTWARE TESTING BASED ON A NORMALIZED CONFIGURATION

(75) Inventors: Jayaram Singonahalli, Belmont, CA (US); Darrin Curtis Alves, Pleasanton, CA (US); Douglas Ray Woolard, Santa Cruz, CA (US)

(73) Assignee: eBay Inc., San Jose, CA (US)

( * ) Notice: Subject to any disclaimer, the term of this patent is extended or adjusted under 35 U.S.C. 154(b) by 1362 days.

(21) Appl. No.: 11/092,146

(22) Filed: Mar. 29, 2005

(65) Prior Publication Data
US 2006/0184838 A1 Aug. 17, 2006

Related U.S. Application Data

(60) Provisional application No. 60/653,003, filed on Feb. 15, 2005.

(51) Int. Cl.
*G06F 9/44* (2006.01)
*G06F 11/30* (2006.01)

(52) U.S. Cl. ............... 717/131; 717/124; 717/127; 702/186

(58) Field of Classification Search .......... None
See application file for complete search history.

(56) References Cited

U.S. PATENT DOCUMENTS

| 6,332,201 | B1* | 12/2001 | Chin et al. ............ 714/28 |
| 7,539,980 | B1* | 5/2009 | Bailey et al. ............ 717/135 |
| 2002/0066077 | A1* | 5/2002 | Leung ............ 717/126 |
| 2002/0088001 | A1* | 7/2002 | Zustak et al. ............ 725/109 |
| 2003/0033118 | A1* | 2/2003 | Peddanna ............ 702/186 |
| 2004/0098230 | A1* | 5/2004 | Richard et al. ............ 702/186 |
| 2005/0005198 | A1* | 1/2005 | Vakrat et al. ............ 714/37 |
| 2005/0022166 | A1* | 1/2005 | Wolff et al. ............ 717/124 |
| 2006/0031090 | A1* | 2/2006 | Tarr et al. ............ 705/1 |
| 2006/0248504 | A1* | 11/2006 | Hughes ............ 717/101 |
| 2007/0244663 | A1* | 10/2007 | Haemel et al. ............ 702/121 |

* cited by examiner

*Primary Examiner*—Tuan Q Dam
*Assistant Examiner*—Hanh T Bui
(74) *Attorney, Agent, or Firm*—Schwegman, Lundberg & Woessner, P.A.

(57) ABSTRACT

A method and a system perform parallel software testing based on a normalized configuration. In some embodiments, a system includes a first hardware system having one or more hardware components to execute a first version of software. The system also includes a second hardware system having one or more hardware components to execute a second version of the software at approximately the same time as the one or more hardware components of the first hardware system are to execute the first version of the software. The one or more hardware components of the first hardware system are essentially equal to the one or more hardware components of the second hardware system.

18 Claims, 3 Drawing Sheets

PARALLEL SOFTWARE TESTING BASED ON A NORMALIZED CONFIGURATION

This application claims the priority benefit of U.S. Provisional Application No. 60/653,003, filed Feb. 15, 2005, which is incorporated herein by reference.

TECHNICAL FIELD

The application relates generally to data processing, and, more particularly, to testing of software.

BACKGROUND

Testing of software prior to its commercial release typically ensures that the software is free of many of the bugs, problems, performance issues, etc. therein. In particular, after a new version of software code has been developed, system level testing determines its effect (performance, bugs, etc.) on the system including other parts of the software, hardware, etc.

An analysis of the performance (e.g., time of execution) between two different versions of software may determine whether the hardware platform needs to be upgraded to preclude a degradation in performance. A conventional approach typically executes one version of the software on a hardware platform and then executes a second version of the software on the same hardware platform. However, this approach may not provide accurate performance analysis of the two versions of the software because the configurations may have changed between times of execution of the two different tests. For example, the hardware platform may have been modified between tests, or the hardware platform may have been executing a maintenance activity during one test that is not executing during the second test. Moreover, new firmware may have been installed, and/or the network may be processing heavier/lighter amounts of traffic. Furthermore, the tests may include accesses to a database. Accordingly, the first test may create new data in the database. The second test may, therefore, be slower because of the traversal of the new data created by the first test.

SUMMARY

According to some embodiments, a method and a system perform parallel software testing based on a normalized configuration. In some embodiments, a system includes a first hardware system having one or more hardware components to execute a first version of software. The system also includes a second hardware system having one or more hardware components to execute a second version of the software at approximately the same time as the one or more hardware components of the first hardware system are to execute the first version of the software. The one or more hardware components of the first hardware system are essentially equal to the one or more hardware components of the second hardware system.

In some embodiments, a system includes a first hardware system having one or more hardware components to execute a baseline version of software. The system also includes a second hardware system having one or more hardware components to execute a release candidate version of the software at approximately the same time as the one or more hardware components of the first hardware system are to execute the baseline version of the software. The system also includes a simulator logic coupled to the first hardware system and the second hardware system through a first network that is essentially normalized. The simulator logic includes a number of agents to input an approximately same set of normalized data into the first hardware system and the second hardware system for execution by the baseline version of the software and by the release candidate version of the software. The system also includes a machine-readable medium coupled to the first hardware system and the second hardware system through a second network that is essentially normalized, wherein execution of the baseline version of the software and execution of the release candidate version of the software are to read and/or write from a same database to be stored in the machine-readable medium.

In some embodiments, a method includes testing a first version of software on a first hardware system. The method also includes testing a second version of the software on a second hardware system at approximately a same time. The first hardware system and the second hardware system have an approximately same number and an approximately same type of hardware components.

In some embodiments, a method includes receiving an amount and a type of input data into a first hardware system, wherein the amount and the type of input data is essentially the same as an amount and type of input data into the second hardware system. The method also includes testing a first version of software on the first hardware system at essentially a same time as testing of a second version of the software on the second hardware system. The testing of the first version and the second version of the software is based on the input data, wherein the testing of the first version. The method also includes inputting and outputting data into a database stored on a machine-readable medium based on the testing of the first version of the software.

In some embodiments, an apparatus includes means for testing a first version of software on a first hardware system. The apparatus also includes means for testing a second version of the software on a second hardware system at approximately a same time. The first hardware system and the second hardware system have an approximately same number and an approximately same type of hardware components.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for parallel testing of multiple versions of software based on a normalized configuration are described. In the following description, numerous specific details are set forth. However, it is understood that embodiments of the invention may be practiced without these specific details. In other instances, well-known circuits, structures and techniques have not been shown in detail in order not to obscure the understanding of this description.

Some embodiments provide for approximately simultaneous/parallel testing of multiple versions of software. Some embodiments allow for performance analysis of a new version of software code relative to a previous or baseline version of the software code. Some embodiments may equalize or normalize other parts of the testing including the hardware, the network connecting the hardware, the time of execution, the input data, the database for storage of the output data, etc. Accordingly, some embodiments may limit the changes between the testing of the new version and the testing of the baseline version to essentially the different versions of the software. Therefore, some embodiments may isolate performance between different versions of software code within about a 2% threshold of accuracy. Moreover, some embodiments may allow the testing of software to be performed more quickly because multiple tests are performed in parallel.

Figure 1:
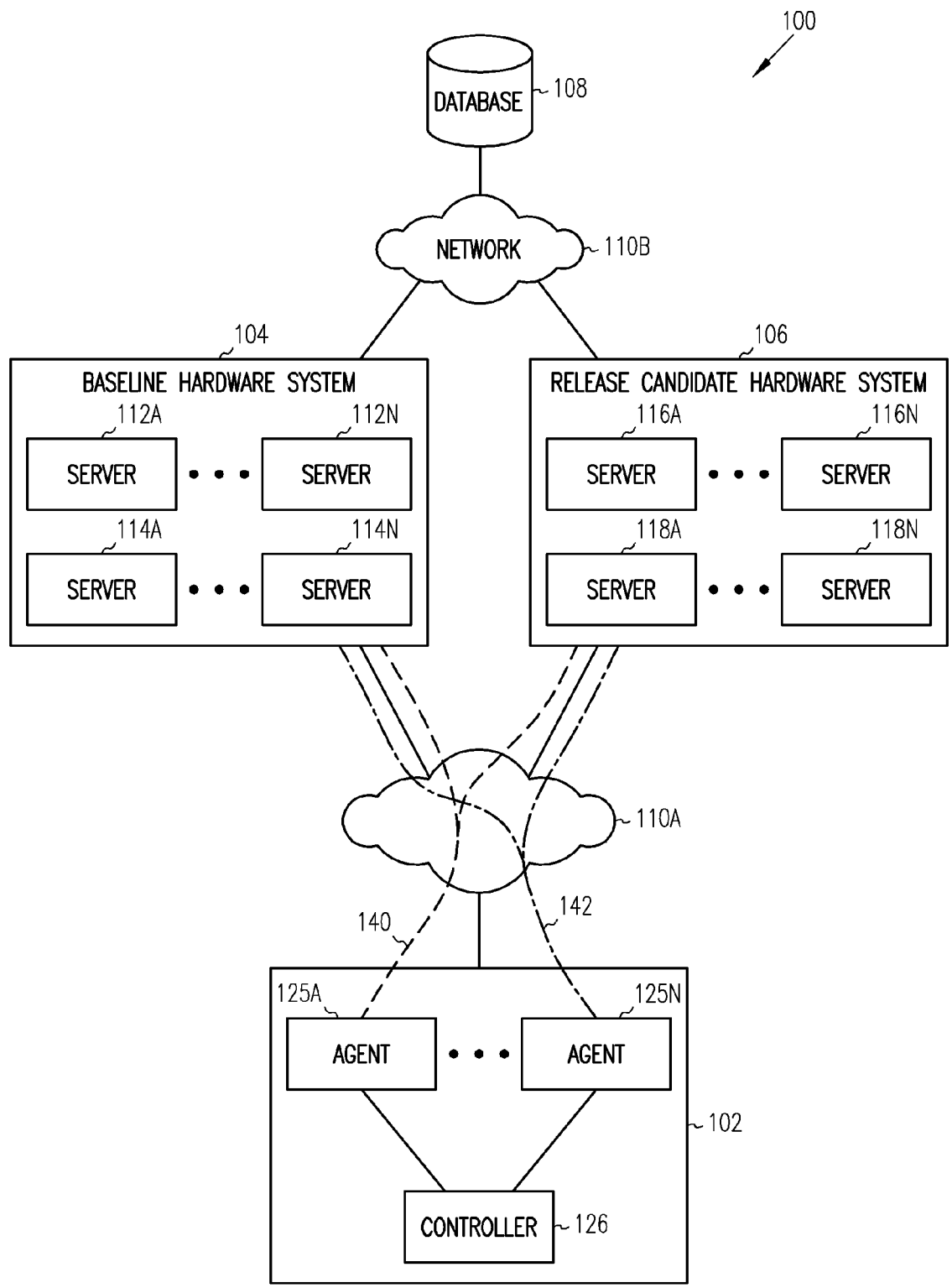
FIG. 1 illustrates a system for parallel testing of software based on a normalized configuration, according to some embodiments of the invention.

FIG. 1 illustrates a system for parallel testing of software based on a normalized configuration, according to some embodiments of the invention. In particular, FIG. 1 illustrates a system 100 that includes a baseline hardware system 104, a release candidate hardware system 106, a simulator 102 and a database 108. The simulator 102 is coupled to the baseline hardware system 104 and to the release candidate hardware system 106 through a network 110A. The database 108 is coupled to the baseline hardware system 104 and to the release candidate hardware system 106 through a network 110B. The network 110A and the network 110B may be different types of networks including Local Area Networks (LANs) (such as virtual LANs or physical LANs), Wide Area Networks (WANs), etc. The network 110A and the network 110B may be an Intranet, the Internet, etc.

The baseline hardware system 104 includes servers 112A-112N and servers 114A-114N. The release candidate hardware system 106 includes servers 116A-116N and servers 118A-118N. The servers 112 and the servers 114 of the baseline hardware system 104 may execute a baseline version of a software application. The servers 116 and the servers 118 of the release candidate hardware system 106 may execute a release candidate version of the software application. For example, software developers may create a release candidate version of software that is an update of a baseline version of software (which may include a number of new features, a number of bug fixes, etc.). As further described below, the two versions of the software are tested in parallel and analyzed. Moreover, as further described below, besides the two different versions of the software, the other components of the tests (including the hardware, the front end, the back end, the network, etc.) are essentially equalized or normalized.

The servers 112A-112N and the servers 114A-114N may be the same or different types of computer devices having the same or different configurations. For example, the server 112A may include B number of microprocessors having an M clock speed; the server 112N may include C number of microprocessors having an N clock speed; the server 114A may include D number of microprocessor having a P clock speed; and the server 114N may include E number of microprocessors having an R clock speed. Moreover, the servers 112A-112N and the servers 114A-114N may include other components that are variable, including the size of the memories therein. In some embodiments, the servers 112A-112N and the servers 114A-114N execute the same or different types of software applications. For example, the servers 112A-112N may operate as application servers for specific types of applications; while the servers 114A-114N may operate as web servers for processing and interfacing with other computer components over a network. For example, the application may be an online auction application, a business software application, etc.

The servers 116A-116N and the servers 118A-118N may be the same or different types of computer devices having the same or different configurations (similar to the servers 112A-112N and the servers 114A-114N). In some embodiments, the servers 116A-116N and the servers 118A-118N execute the same or different types of software applications. For example, the servers 116A-116N may operate as application servers for specific types of applications; while the servers 118A-118N may operate as web servers for processing and interfacing with other computer components over a network.

In some embodiments, the components of the baseline hardware system 104 and the components of the release candidate hardware system 106 are essentially equal. For example, the baseline hardware system 104 and the release candidate hardware system 106 may each have two different web servers and two different application servers. Moreover, if the baseline hardware system 104 includes two servers having X number of microprocessors operating at N clock speed and two servers having Y number of microprocessors operating at O clock speed, the release candidate hardware system 106 may have X number of microprocessors operating at N clock speed and two servers having Y number of microprocessors operating at O clock speed.

In some embodiments, the components of the baseline hardware system 104 and the components of the release candidate hardware system 106 may not be equal. For example, one or more servers may include a greater number of microprocessors, microprocessors of differing clock rates, etc. Accordingly, the components of the baseline hardware system 104 and the components of the release candidate hardware system 106 may be normalized. For example, if the number of processors and/or the clock rates differ, during the performance analysis (further described below), one statistic may be processors/hit/second rate. Such a statistic allows for the determination of the usage of a processor for a given server.

The simulator 102 includes a controller 126 and agents 125A-125N. The controller 126 and the agents 125A-125N may be representative of applications executing on different servers. Alternatively, a part or all of the controller 126 and the agents 125A-125N may be executing on a same computing device. The controller 126 may control the operations of the agents 125A-125N. For example, in some embodiments, the agents 125A-125N are configured to execute tests that cause the inputting of data traffic into the baseline hardware system 104 and the release candidate hardware system 106. The servers therein may process the data traffic. For example, assume that the applications executing on the servers in the baseline hardware system 104 and the release candidate hardware system 106 are part of an online auction site. Such applications may be configured to receive data traffic related to different operations for online auctioning. For example, the data traffic may be related to requests to create an auction for a product. Additionally, the data traffic may be related to requests for making a bid for an auction, creating a user account, providing feedback on a given auction, etc.

Accordingly, each agent 125 may generate different types of data traffic. In some embodiments, the data traffic distributed by each agent 125 is essentially normalized. In particular, the data traffic generated by each agent 125 is evenly distributed to the baseline hardware system 104 and the release candidate hardware system 106. As shown, the agent 125A generates data traffic 140, which is evenly distributed to the baseline hardware system 104 and the release candidate hardware system 106. The agent 125N generates data traffic 142, which is evenly distributed to the baseline hardware system 104 and the release candidate hardware system 106. For example, if the agent 125A generates 1000 requests to make a bid on different products, 500 of the requests are transmitted to the baseline hardware system 104 and 500 of the requests are transmitted to the release candidate hardware system 106. Therefore, if the agent 125A is slow in comparison to the agent 125N, the differences are normalized as the agent 125A is equally slow for both the baseline hardware system 104 and the release candidate hardware system 106.

Moreover, in some embodiments, the agents 125 essentially evenly distribute the same type of data traffic to the baseline hardware system 104 and the release candidate hardware system 106. For example, 9000 different user accounts may bid on the same 50,000 products. The profiles of the users may be the sane for the baseline hardware system 104 and the release candidate hardware system 106. In particular, the time to process a user with a greater number of feedbacks is typically greater than a user with a lesser number of feedbacks. For example, 3000 users may have X number of feedbacks; 3000 users may have Y number of feedbacks; and 3000 users may have Z number of feedbacks. Accordingly, the 9000 users essentially evenly bid on the same type of products for both the baseline hardware system 104 and the release candidate hardware system 106. Moreover, the types of products for which an auction is being created for and/or being bid on are the same for the baseline hardware system 104 and the release candidate hardware system 106. For example, 20,000 products may relate to automobiles, 10,000 products may relate to books, and 20,000 may relate to clothing.

In some embodiments, the interactions with the database 108 by the baseline hardware system 104 and the release candidate hardware system 106 are normalized. In particular, the servers in the baseline hardware system 104 and the servers in the release candidate hardware system 106 update, create, read, delete, etc. the same data and data structures in the database 108. Therefore, in some embodiments, the database 108 is compatible with both versions of the software being tested in the baseline hardware system 104 and the release candidate hardware system 106. Therefore, if the two different versions of the software are attempting to update a same data structure, a conventional lock and release database mechanism may be used to resolve the differences.

Moreover, the network connectivity for the baseline hardware system 104 and the release candidate hardware system 106 with other components in the system 100 may be normalized. As described above, the simulator 102 is coupled to the baseline hardware system 104 and the release candidate hardware system 106 through a same network (the network 110A). The database 108 is coupled to the baseline hardware system 104 and the release candidate hardware system 106 through a same network (the network 110B). Accordingly, any increases or decreases in network speed for a given network are evenly distributed for the data traffic into and out of the baseline hardware system 104 and the release candidate hardware system 106.

Figure 2:
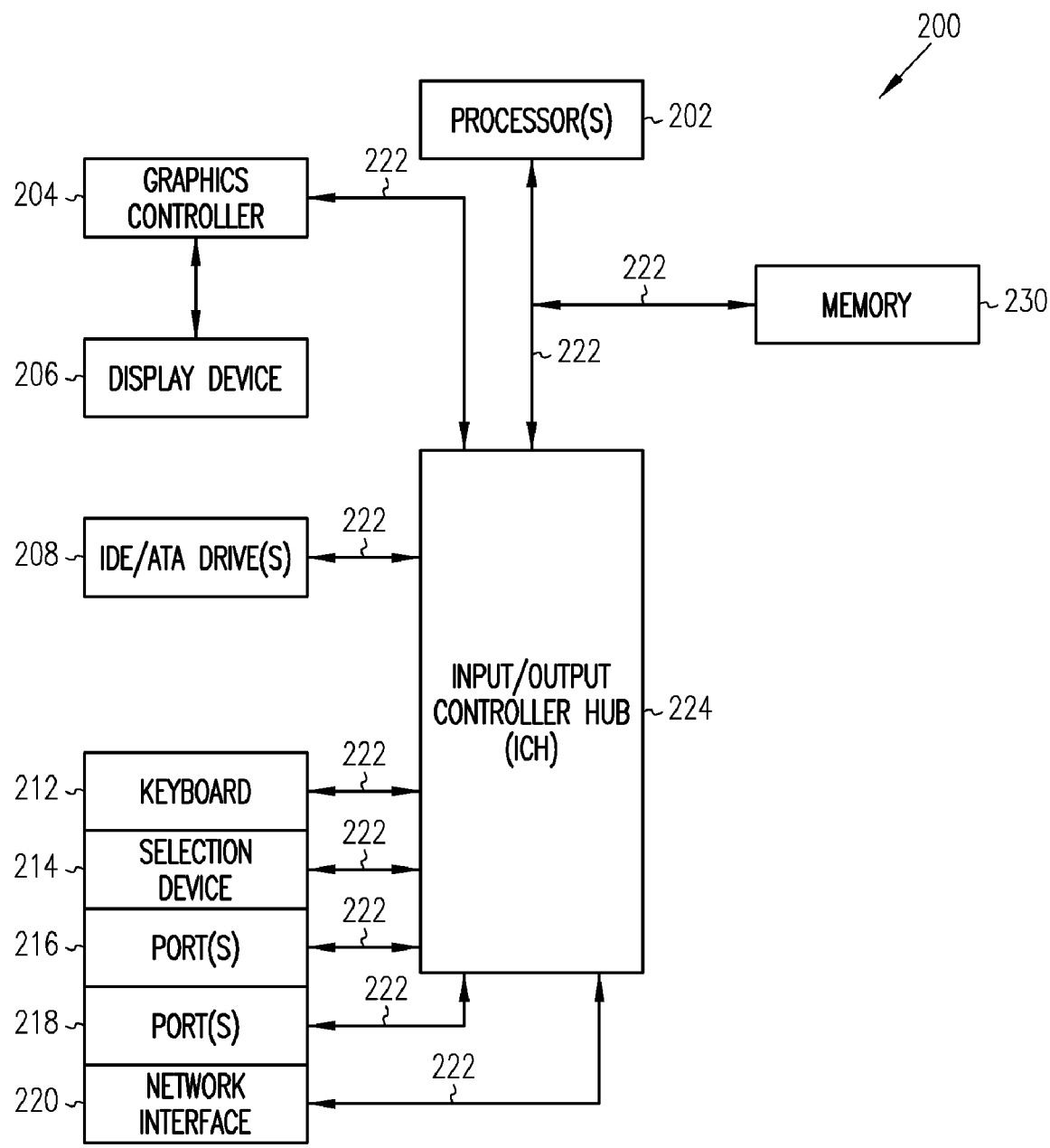
FIG. 2 illustrates a computer device that executes software for performing operations related to parallel testing of multiple versions of software, according to some embodiments of the invention.

Some embodiments wherein software performs operations related to parallel testing of multiple versions of software as described herein are now described. In particular, FIG. 2 illustrates a computer device that executes software for performing operations related to parallel testing of multiple versions of software, according to some embodiments of the invention. FIG. 2 illustrates a computer device 200 that may be representative of one of the servers 112, the servers 114, the servers 116, the servers 118, the agents 125 or the controller 126.

As illustrated in FIG. 2, a computer device 200 comprises processor(s) 202. The computer device 200 also includes a memory 230, a processor bus 222, and an input/output controller hub (ICH) 224. The processor(s) 202, the memory 230, and the ICH 242 are coupled to the processor bus 222. The processor(s) 202 may comprise any suitable processor architecture. The computer device 200 may comprise one, two, three, or more processors, any of which may execute a set of instructions in accordance with some embodiments of the invention.

The memory 230 stores data and/or instructions, and may comprise any suitable memory, such as a random access memory (RAM). For example, the memory 230 may be a Static RAM (SRAM), a Synchronous Dynamic RAM (SDRAM), DRAM, a double data rate (DDR) Synchronous Dynamic RAM (SDRAM), etc. A graphics controller 204 controls the display of information on a display device 206, according to an embodiment of the invention.

The ICH 224 provides an interface to Input/Output (I/O) devices or peripheral components for the computer device 200. The ICH 224 may comprise any suitable interface controller to provide for any suitable communication link to the processor(s) 202, the memory 230 and/or to any suitable device or component in communication with the ICH 224. For an embodiment of the invention, the ICH 224 provides suitable arbitration and buffering for each interface.

In some embodiments, the ICH 224 provides an interface to one or more suitable Integrated Drive Electronics (IDE)/Advanced Technology Attachment (ATA) drive(s) 208, such as a hard disk drive (HDD). In an embodiment, the ICH 224 also provides an interface to a keyboard 212, a mouse 214, one or more suitable devices through ports 216-218 (such as parallel ports, serial ports, Universal Serial Bus (USB), Firewire ports, etc.). In some embodiments, the ICH 224 also provides a network interface 220 though which the computer device 200 may communicate with other computers and/or devices.

Figure 3:
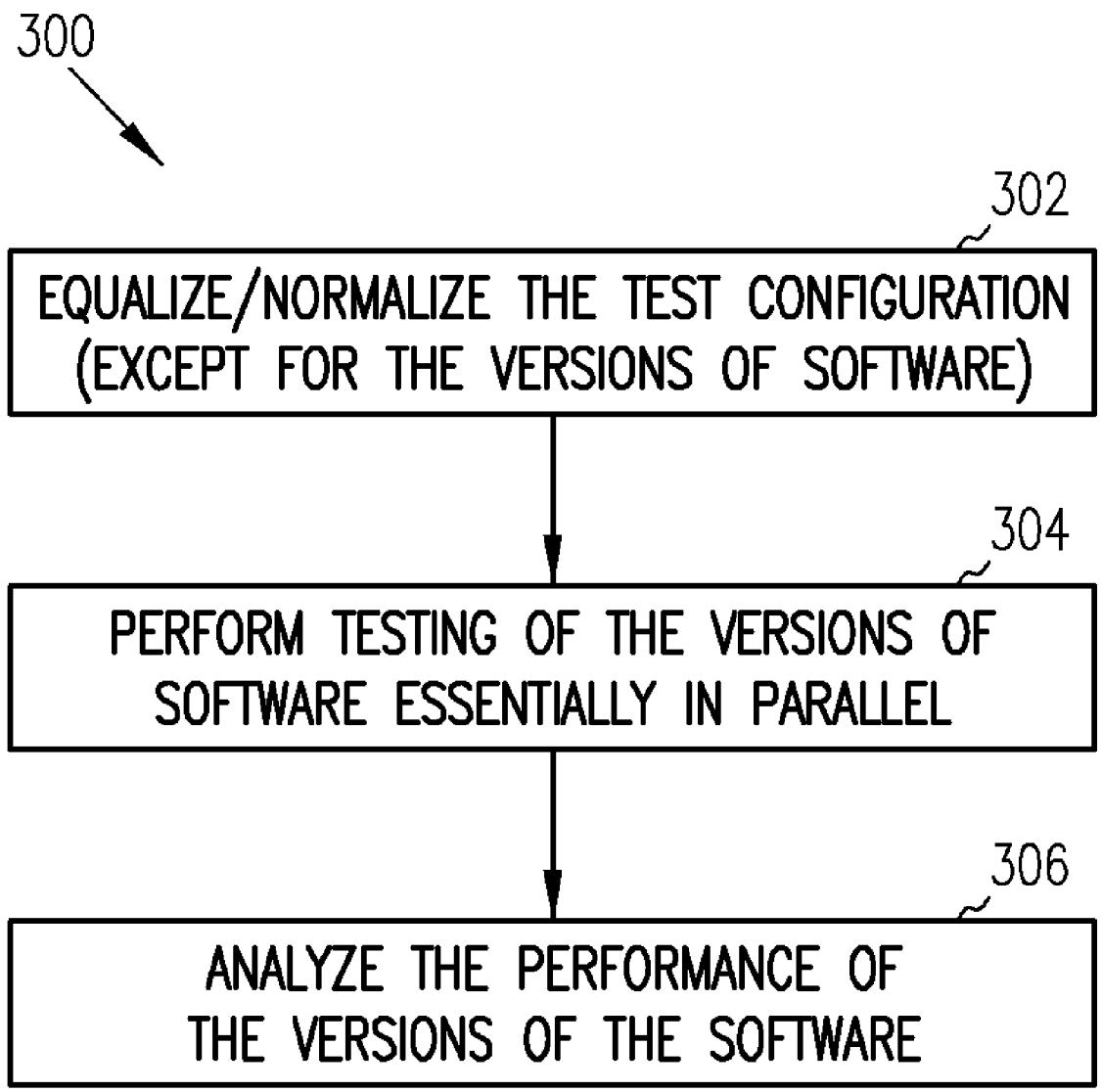
FIG. 3 illustrates a flow diagram of operations for parallel testing of multiple versions of software based on a normalized configuration, according to some embodiments of the invention.

The operations of processing of parallel testing of multiple versions of software based on a normalized configuration are now described. In particular, FIG. 3 illustrates a flow diagram of operations for parallel testing of multiple versions of software based on a normalized configuration, according to some embodiments of the invention. The flow diagram 300 is described in reference to FIG. 1. The flow diagram 300 commences at block 302.

At block 302, the test configuration for the different versions of the software is equalized/normalized (except for the versions of the software). The hardware systems, the network connectivity, the input data set, the output database and the time of execution may be equalized/normalized. As described above, the components of the baseline hardware system 104 and the release candidate hardware system 106 may be equalized. Moreover, the input data set from the agents 125A-125N, the interface into the database 108, the network connectivity between the different components in the system 100 and the time of execution may be normalized. The flow continues at block 304.

At block 304, testing of the versions of the software is performed essentially in parallel. With reference to the system 100, the controller 126 may cause the agents 125A-125N to execute a number of different tests. Such tests may cause one or more of the agents 125 to generate data traffic to be received essentially equally by the baseline hardware system 104 and the release candidate hardware system 106. For example for an online auction application, the agents 125 may send a number of different requests to list products, a number of different bids for products from a number of different users. Accordingly, a given agent 125 may essentially evenly distribute the same amount and type of data traffic for processing. The flow continues at block 306.

At block 306, analysis of the performance of the versions of the software is performed. With reference to the system 100, the execution time of the tests to be processed by the servers 112, the servers 114, the servers 116 and the servers 118 may be monitored. For example, the usage of the microprocessors in the servers 112, the servers 114, the servers 116 and the servers 118 may be monitored. The execution time of the database calls into the database 108 may be monitored. The individual parts of the code in the software may be monitored. For example, the speed of execution of a particular function and/or how many times a particular function is executed may be monitored. In some embodiments, such analysis may be performed by software and/or firmware executing on the servers 112, the servers 114, the servers 116 and the servers 118.

Accordingly, as described, some embodiments allow for a more accurate prediction of the performance of a version of software relative to a different version. Some embodiments may be in a range of accuracy of approximately 2%-3%. Conventional approaches may be much higher (e.g., 10%-15%). Therefore, some embodiments allow for a more accurate prediction of the actual amount of hardware needed so that there is no performance degradation. For example, assume that there is a 10% degradation in performance (between execution of two different versions of software) and that there are 600 servers in the release candidate hardware system 106. Therefore, to preclude a performance degradation, either 60 new servers need to be added and/or the new version of software needs to improve its performance. Accordingly, if the range of accuracy is lower, a more accurate determination may be made with regard to the amount and type of hardware needed to preclude performance degradation. The operations of the flow diagram 300 are complete.

Embodiments are not limited to the configurations shown above. For example, while described such that two versions of the software are being tested in parallel, any number of such versions may be tested. Moreover, while described with reference to a baseline version and a release candidate version, some embodiments are not so limited. For example, two different baseline versions may be tested; two different release candidate versions may be tested; two different baseline versions and a release candidate version may be tested; a baseline version and two different release candidate versions may be tested, etc. Furthermore, while described with reference to servers, some embodiments may include other types of hardware in the system in which the tests are being performed.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or nonvolatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for parallel testing of multiple versions of software based on a normalized configuration, in accordance with some embodiments of the invention. A flow diagram illustrates the operations for parallel testing of multiple versions of software based on a normalized configuration, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A system including:
 a first hardware system having one or more hardware components to execute a first version of software;
 a second hardware system having a further one or more hardware components to execute a second version of the software as the one or more hardware components of the first hardware system execute the first version of the software, the one or more hardware components of the first hardware system being essentially equal to the further one or more hardware components of the second hardware system;

a first agent coupled to the first hardware system and the second hardware system, the first agent to generate and to distribute a first type of a first data traffic to the first hardware system and the second hardware system, the first data traffic being evenly distributed to the first hardware system and the second hardware system, the first hardware system testing the first version based on the first data traffic and the testing including monitoring a first speed of execution of a particular function of the first version, the second hardware system testing the second version based on the first data traffic and the testing including monitoring a second speed of execution of the particular function of the second version and analyzing a performance between the first and second versions based on the first and second speeds; and a second agent coupled to the first hardware system and the second hardware system, the second agent to generate and to distribute a second type of a second data traffic to the first hardware system and the second hardware system, the second data traffic being evenly distributed to the first hardware system and the second hardware system, the first type of the first data traffic being different from the second type of the second data traffic, the first hardware system testing the first version based on the second data traffic and the testing including monitoring a third speed of execution of the particular function of the first version, the second hardware system testing the second version based on the second data traffic and the testing including monitoring a fourth speed of execution of the particular function of the second version and analyzing an additional performance between the first and second versions based on the third and fourth speeds.

2. The system of claim 1, wherein the first version of the software is a baseline version of the software and the second version of the software is a release candidate version of the software.

3. The system of claim 1, wherein execution of the first version of the software and execution of the second version of the software are to read from or write to a same database stored in a machine-readable medium.

4. The system of claim 3, wherein execution of the first version of the software and execution of the second version of the software are to read from or write to a same set of data structures in the same database.

5. The system of claim 3, wherein the read from or the write to results in a database call into the same database, the first hardware system to further monitor an execution time of the database call.

6. The system of claim 3, wherein the same database is coupled to the first hardware system and the second hardware system through a same network.

7. The system of claim 1, wherein the one or more hardware components of the first hardware system comprise a number of microprocessors operating at a particular clock speed, and wherein the further one or more hardware components of the second hardware system comprise the number of the microprocessors operating at the particular clock speed.

8. The system of claim 1, wherein the execution of the first version of the software and the execution of the second version of the software result in one or more of an update, a creation, a read, or a deletion of a same data stored in a database.

9. The system of claim 1, further comprising a controller coupled to the first agent and the second agent, the controller causing the first agent to generate and to distribute the first type of the first data traffic and causing the second agent to generate and to distribute the second type of the second data traffic.

10. A system including:

a first hardware system having one or more hardware components to execute a baseline version of software;

a second hardware system having a further one or more hardware components to execute a release candidate version of the software as the one or more hardware components of the first hardware system execute the baseline version of the software;

a simulator logic coupled to the first hardware system and the second hardware system through a first network, the simulator logic including a number of agents to generate and to distribute different types of data traffic to each of the first hardware system and the second hardware system to be processed by the first hardware system together with the baseline version of the software and to be processed by the second hardware system together with the release candidate version of the software, a first agent of the number of agents to generate and to distribute a first type of a first data traffic from the different types to the first hardware system and the second hardware system, the first data traffic being evenly distributed to the first hardware system and the second hardware system, the first hardware system testing the first version based on the first data traffic and the testing including monitoring a first speed of execution of a particular function of the first version, the second hardware system testing the second version based on the first data traffic and the testing including monitoring a second speed of execution of the particular function of the second version and analyzing a performance between the first and second versions based on the first and second speeds, a second agent of the number of agents to generate and to distribute a second type of a second data traffic from the different types to the first hardware system and the second hardware system, the second data traffic being evenly distributed to the first hardware system and the second hardware system, the first type of the first data traffic being different from the second type of the second data traffic, the first hardware system testing the first version based on the second data traffic and the testing including monitoring a third speed of execution of the particular function of the first version, the second hardware system testing the second version based on the second data traffic and the testing including monitoring a fourth speed of execution of the particular function of the second version and analyzing an additional performance between the first and second versions based on the third and fourth speeds; and a machine-readable medium coupled to the first hardware system and the second hardware system through a second network, the execution of the baseline version of the software is to cause the first hardware system to read from or write to a database stored in the machine-readable medium.

11. A method including:

distributing a first type of a first data traffic to a first hardware system having hardware components and a second hardware system having further hardware components that are essentially equal to the hardware components of the first hardware system, the first data traffic being evenly distributed to the first hardware system and the second hardware system;

distributing a second type of a second data traffic to the first hardware system and the second hardware system, the second data traffic being evenly distributed to the first hardware system and the second hardware system, the second type of the second data traffic being different from the first type of the first data traffic;

testing a first version of software on the first hardware system using the first type of the first data traffic and the second type of the second data traffic, the testing including monitoring a first speed of execution of a particular function of the first version; and testing a second version of the software on the second hardware system at a same time as the testing of the first version of software using the first type of the first data traffic and the second type of the second data traffic, the testing including monitoring a second speed of execution of the particular function of the second version and analyzing a performance between the first and second versions based on the first and second speeds.

12. The method of claim 11, wherein the testing of the first version and the second version of the software causes the first hardware system and the second hardware system to input and to output data into and from a database stored on a machine-readable medium.

13. The method of claim 12, wherein the testing of the first version of the software causes the first hardware system and the second hardware system to input and to output data into and from a set of data structures in the database.

14. A machine-readable medium that provides instructions which, when executed by a machine, cause said machine to perform operations, the operations comprising:

distributing a first type of a first data traffic to a first hardware system having hardware components and a second hardware system having further hardware components that are essentially equal to the hardware components of the first hardware system, the first data traffic being evenly distributed to the first hardware system and the second hardware system;

distributing a second type of a second data traffic to the first hardware system and the second hardware system, the second data traffic being evenly distributed to the first hardware system and the second hardware system, the second type of the second data traffic being different from the first type of the first data traffic;

testing a first version of software on the first hardware system using the first type of the first data traffic and the second type of the second data traffic, the testing including monitoring a first speed of execution of a particular function of the first version;

testing a second version of the software on the second hardware system at a same time as the testing of the first version of software using the first type of the first data traffic and the second type of the second data traffic, the testing including monitoring a second speed of execution of the particular function of the second version and analyzing a performance between the first and second versions based on the first and second speeds.

15. An apparatus including:

means for distributing a first type of a first data traffic to a first hardware system having hardware components and a second hardware system having further hardware components that are essentially similar to the hardware components of the first hardware system, the first data traffic being evenly distributed to the first hardware system and the second hardware system;

means for distributing a second type of a second data traffic to the first hardware system and the second hardware system, the second data traffic being evenly distributed to the first hardware system and the second hardware system, the second type of the second data traffic being different from the first type of the first data traffic;

means for testing a first version of software on the first hardware system using the first type of the first data traffic and the second type of the second data traffic, the testing including monitoring a first speed of execution of a particular function of the first version; and means for testing a second version of the software on the second hardware system at a same time as the testing of the first version of the software using the first type of the first data traffic and the second type of the second data traffic, the testing including means for monitoring a second speed of execution of the particular function of the second version and for analyzing a performance between the first and second versions based on the first and second speeds.

16. The apparatus of claim 15, wherein the means for testing of the first version of the software causes the first hardware system to input and to output data into and from a database stored on a machine-readable medium, and wherein the means for testing of the second version of the software causes the second hardware system to input and the data into and from the database.

17. The apparatus of claim 16, wherein the means for testing of the first version of the software causes the first hardware system to input and to output data into and from a set of data structures in the database, and wherein the means for testing of the second version of the software causes the second hardware system to input and to output data into and from the set of data structures in the database.

18. A simulator logic adapted to couple with a first hardware system and with a second hardware system, the simulator logic including:

a number of agents to generate and to distribute different types of data traffic that are inputted into each of the first hardware system and the second hardware system to be processed by the first hardware system and the second hardware system, the first hardware system having hardware components and the second hardware system having further components that are essentially equal to the hardware components of the first hardware system, the inputting of the different types of data traffic into the first hardware system for testing a first version of a software on the first hardware system, the inputting of the different types of data traffic into the second hardware system for testing a second version of the software on the second hardware system, the testing of the first version including monitoring a first speed of execution of a particular function of the first version, the testing of the second version including monitoring a second speed of execution of the particular function of the second version and analyzing a performance between the first and second versions based on the first and second speeds; and a controller coupled to the number of agents, the controller to cause the number of agents to generate and to distribute the different types of data traffic, a first agent of the number of agents to generate and to distribute a first type of a first data traffic from the different types to the first hardware system and the second hardware system, the first data traffic being evenly distributed to the first hardware system and the second hardware system, and a second agent of the number of agents to generate and to distribute a second type of a second data traffic from the different types to the first hardware system and the second hardware system, the second data traffic being evenly distributed to the first hardware system and the second hardware system, the first type of the first data traffic being different from the second type of the second data traffic.

\* \* \* \* \*

UNITED STATES PATENT AND TRADEMARK OFFICE
CERTIFICATE OF CORRECTION

| | | |
|---|---|---|
| PATENT NO. | : 7,793,269 B2 | Page 1 of 1 |
| APPLICATION NO. | : 11/092146 | |
| DATED | : September 7, 2010 | |
| INVENTOR(S) | : Jayaram Singonahalli et al. | |

It is certified that error appears in the above-identified patent and that said Letters Patent is hereby corrected as shown below:

In column 5, line 21, delete "sane" and insert -- same --, therefor.

In column 12, line 36, in Claim 16, after "and" insert -- to output --.

Signed and Sealed this

Sixteenth Day of November, 2010

David J. Kappos
*Director of the United States Patent and Trademark Office*